United States Patent
Sano et al.

(10) Patent No.: US 12,364,948 B2
(45) Date of Patent: Jul. 22, 2025

(54) CARBON DIOXIDE FIXATION METHOD AND CARBON DIOXIDE FIXATION SYSTEM

(71) Applicant: KABUSHIKI KAISHA TOSHIBA, Tokyo (JP)

(72) Inventors: Kenji Sano, Inagi (JP); Hitomi Saito, Taito (JP); Hirohisa Miyamoto, Kamakura (JP); Toshihiro Imada, Kawasaki (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 454 days.

(21) Appl. No.: 17/469,711

(22) Filed: Sep. 8, 2021

(65) Prior Publication Data

US 2022/0297058 A1    Sep. 22, 2022

(30) Foreign Application Priority Data

Mar. 19, 2021 (JP) .................. 2021-046334

(51) Int. Cl.
*B01D 53/32* (2006.01)
*B01D 53/14* (2006.01)
(Continued)

(52) U.S. Cl.
CPC ....... *B01D 53/326* (2013.01); *B01D 53/1475* (2013.01); *B01D 53/62* (2013.01);
(Continued)

(58) Field of Classification Search
CPC .. B01D 53/326; B01D 53/1475; B01D 53/62; B01D 2257/504; C25B 1/18;
(Continued)

(56) References Cited

U.S. PATENT DOCUMENTS 4,496,443 A * 1/1985 Mack .................. A23K 20/24
                                                   205/742
7,887,694 B2 * 2/2011 Constantz ............ C01F 5/24
                                                   423/220
(Continued)

FOREIGN PATENT DOCUMENTS

JP    2003-288955 A    10/2003
JP    2010-12392 A      1/2010
(Continued)

OTHER PUBLICATIONS

Straumanis et al. "Disintegration of Magnesium While Dissolving Anodically in Neutral and Acidic Solutions" 1963 J. Electrochem. Soc. 110 357 (Year: 1963).*

(Continued)

*Primary Examiner* — Luan V Van
*Assistant Examiner* — Alexander R. Parent
(74) *Attorney, Agent, or Firm* — Oblon, McClelland, Maier & Neustadt, L.L.P.

(57) ABSTRACT

A carbon dioxide fixation method includes: immersing a magnesium alloy in an aqueous solvent; blowing carbon dioxide-containing gas into the aqueous solvent; and electrically energizing and thereby subjecting the aqueous solvent to electrolysis treatment so as to produce precipitates containing magnesium carbonate. The method can be carried out in a system having: a treating bath for storing a magnesium alloy and an aqueous solvent to treat a magnesium alloy in which the magnesium alloy is treated, a gas-introducing unit for blowing carbon dioxide-containing gas into the aqueous solvent, a pair of electrodes for applying voltage to the aqueous solvent so as to conduct electrolysis treatment, and a power control unit connected to the electrodes.

11 Claims, 1 Drawing Sheet

(51) Int. Cl.
    *B01D 53/62*      (2006.01)
    *C01F 5/24*      (2006.01)
    *C25B 1/18*      (2006.01)
    *C25B 9/17*      (2021.01)
    *C25B 11/046*      (2021.01)
    *C25B 15/031*      (2021.01)
    *C25B 15/08*      (2006.01)

(52) U.S. Cl.
    CPC ............... *C01F 5/24* (2013.01); *C25B 1/18* (2013.01); *C25B 9/17* (2021.01); *C25B 11/046* (2021.01); *C25B 15/031* (2021.01); *C25B 15/08* (2013.01); *C25B 15/083* (2021.01); *B01D 2251/402* (2013.01); *B01D 2252/103* (2013.01); *B01D 2257/504* (2013.01); *B01D 2258/06* (2013.01)

(58) Field of Classification Search
    CPC ..... C25B 15/031; C25B 11/046; C25B 11/04; C25B 11/042; C25B 1/20; C01F 5/24; C22B 1/005
    USPC ........................................................ 204/480
    See application file for complete search history.

(56) References Cited

U.S. PATENT DOCUMENTS

| | | | | |
|---|---|---|---|---|
| 8,834,688 | B2* | 9/2014 | Gilliam | C25B 9/00 204/290.01 |
| 10,363,523 | B2* | 7/2019 | Toyama | B01D 53/502 |
| 11,710,840 | B2* | 7/2023 | Kim | C25B 1/22 429/9 |
| 2011/0036728 | A1* | 2/2011 | Farsad | H01M 6/34 204/253 |
| 2012/0288431 | A1 | 11/2012 | Chizmeshya et al. | |
| 2020/0038807 | A1 | 2/2020 | Naito et al. | |

FOREIGN PATENT DOCUMENTS

| | | | |
|---|---|---|---|
| JP | 2012-50905 A | 3/2012 | |
| JP | 2012-513944 A | 6/2012 | |
| JP | 2013-505124 A | 2/2013 | |
| JP | 2014-151270 A | 8/2014 | |
| JP | 2019-30840 A | 2/2019 | |
| JP | 2021-84075 A | 6/2021 | |
| WO | WO-2019182284 A1 * | 9/2019 | ............... C25B 1/22 |

OTHER PUBLICATIONS

Dowsett et al. "Exploring the scope of capacitance-assisted electrochemical carbon dioxide capture" Dalton Trans., 2018, 47, 10447-10452 (Year: 2018).*

Lamb et al. "Capacitance-Assisted Sustainable Electrochemical Carbon Dioxide Mineralisation" ChemSusChem 2018, 11, 137-148 (Year: 2018).*

Furrer et al. (ASM Handbook, vol. 22A—Fundamentals of Modeling for Metals Processing—46. Periodic Table of Elements (p. 585), 2009, ASM International) (Year: 2009).*

Hiromi Eba, "Absorption of Carbon Dioxide by Metallic Iron and Its Conversion to Useful Substances", 2008-2010, 14 pages, (with English Translation).

Notice of allowance issued on Jun. 28, 2024, in Japanese Patent Application No. 2021-046334, (with machine translation).

* cited by examiner

CARBON DIOXIDE FIXATION METHOD AND CARBON DIOXIDE FIXATION SYSTEM

CROSS-REFERENCE TO RELATED APPLICATIONS

This application is based upon and claims the benefit of priority from the prior Japanese Patent Application No. 2021-046334, filed on Mar. 19, 2021, the entire contents of which are incorporated herein by reference.

FIELD

Embodiments of the present disclosure relate to carbon dioxide fixation technology.

BACKGROUND

In view of frequent meteorological disasters caused by global warming, it is urgent for humanity to reduce carbon dioxide ($CO_2$) as a green-house effect gas. Until now, various $CO_2$ reduction methods have been proposed and carried out. However, it cannot be said that they are satisfying enough. For example, in a CCS (carbon capture and storage) system, $CO_2$ emitted from thermal power plants and the like is made to be absorbed in an amine aqueous solution. Thereafter, the amine aqueous solution containing the absorbed $CO_2$ is heated to release $CO_2$, which is then recovered. The recovered $CO_2$ may be reused and consumed, but often cannot be completely used up to leave surplus $CO_2$. It is studied that the surplus $CO_2$ is released into the deep underground and stored in deep strata. Actually, however, there are not many strata suitable for storing $CO_2$ according to this method. Meanwhile, it is also studied that $CO_2$ is electrochemically reduced to convert into valuable resources, which are then recovered. However, this study has not been put into practice yet.

Further, it is still also studied that $CO_2$ is fixated in the form of iron carbonate. Specifically, for utilizing iron wastes, the wastes are ground with ball mills and the like and then made to react with $CO_2$ so as to fixate $CO_2$ in the form of iron carbonate. However, this method consumes huge energy and it is fear that $CO_2$ may be emitted for the purpose of obtaining that energy.

In order to reduce $CO_2$ in the atmosphere, various methods have been thus researched. However, when carried out in practice, they generally use energy. Accordingly, if the method is inefficient, there is a risk that energy may be consumed in such a large amount that the amount of emitted $CO_2$ is larger than that of reduced $CO_2$. For example, in a CCS system, energy is consumed in the step in which $CO_2$ is released from the amine solution containing the absorbed $CO_2$. There is a trial calculation estimating that energy. According to the trial calculation, the energy used for recovering and separating $CO_2$ emitted from power plants may correspond to 40% of the electric power generated by the power plants. Further, in consideration of energy for transporting $CO_2$ to far-located underground reservoirs and for building facilities of the transportation, a huge amount of energy is required. Thus, there is a dilemma that reduction of $CO_2$ accompanies generation of $CO_2$. In view of that, it is required to fixate $CO_2$ in such a stable and harmless form that the $CO_2$ can be easily disposed of.

DETAILED DESCRIPTION

Figure 1:
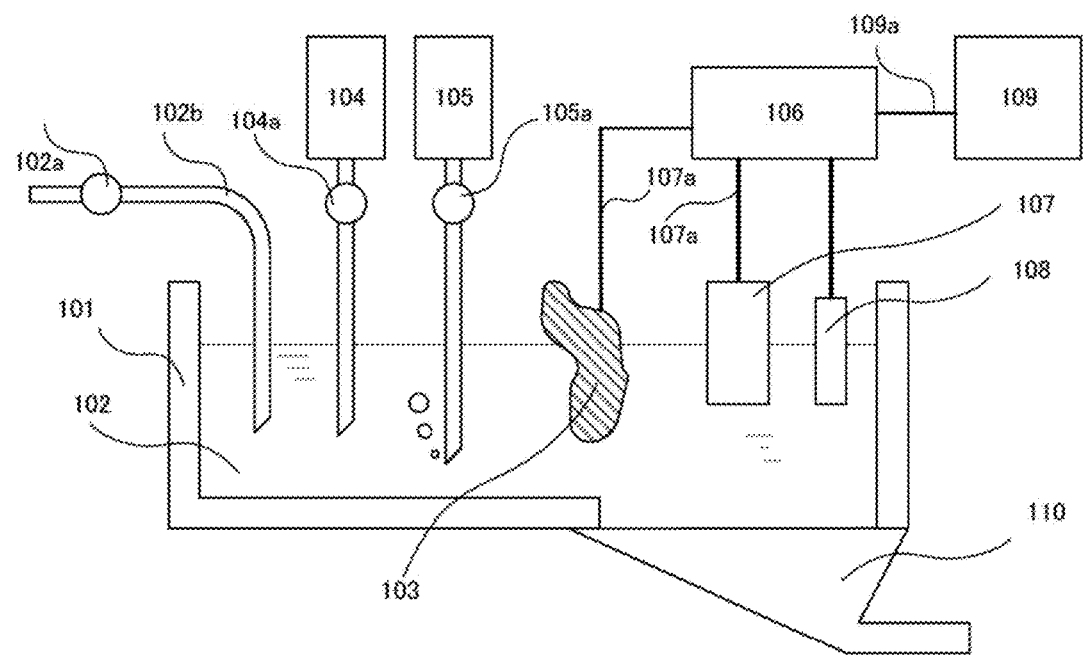
FIG. 1 schematically shows a carbon dioxide fixation system according to the embodiment.

The carbon dioxide fixation method according to the embodiment comprises:
- a step in which a magnesium alloy is immersed in an aqueous solvent;
- a gas-blowing step in which carbon dioxide-containing gas is blown into said aqueous solvent; and
- an electrolysis treatment step in which said aqueous solvent is electrically energized and thereby subjected to electrolysis treatment so as to produce precipitates containing magnesium carbonate.

Further, the carbon dioxide fixation system according to the embodiment comprises:
- a treating bath for storing a magnesium alloy and an aqueous solvent in which said magnesium alloy is treated,
- a gas-introducing unit with which carbon dioxide-containing gas is blown into said aqueous solvent,
- a pair of electrodes with which voltage is applied to said aqueous solvent so as to conduct electrolysis treatment, and
- a power control unit connected to said electrodes.

Further, the method for producing precipitates containing magnesium carbonate according to the embodiment, comprising:
- immersing a magnesium alloy in an aqueous solvent;
- blowing carbon dioxide-containing gas into the aqueous solvent; and
- electrically energizing and thereby subjecting the aqueous solvent to electrolysis treatment so as to produce precipitates containing magnesium carbonate.

Embodiments will now be explained with reference to the accompanying drawings.

The embodiment provides: a readily practicable $CO_2$ fixation method in which a magnesium alloy is used as a material for fixating $CO_2$ in combination with electrolysis treatment; and also a system in which the fixation method can be easily operated. In the following description, the embodiment will be explained with reference to the drawings.

When brought into contact with an acidic aqueous solution such as hydrochloric acid, a magnesium alloy is dissolved to generate magnesium ions in accordance with the formula (1):

$$Mg + 2HCl \rightarrow Mg^{2+} + 2Cl^- + H_2\uparrow \qquad (1).$$

Subsequently, $CO_2$ is dissolved in the aqueous solution containing magnesium ions and then the solution is subjected to electrolysis treatment. As a result of the electrolysis treatment, magnesium carbonate is formed.

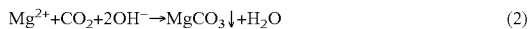
$$Mg^{2+} + CO_2 + 2OH^- \rightarrow MgCO_3\downarrow + H_2O \qquad (2)$$

The formed magnesium carbonate is insoluble in water and hence deposited as precipitates. In addition, magnesium carbonate has low toxicity and hence is easy to handle. Accordingly, $CO_2$ can be thus fixated as harmless solids by the above process.

In order to make the above reactions proceed;
first, a magnesium alloy is immersed in an aqueous solvent, into which carbon dioxide-containing gas is then blown; and subsequently
the above aqueous solvent is electrically energized and thereby subjected to electrolysis treatment so as to produce precipitates containing magnesium carbonate.

In this method, an aqueous solvent is used for conducting the electrolysis treatment. There are no particular restrictions on the aqueous solvent as long as the electrolysis treatment can be carried out therein. The aqueous solvent may contain an organic solvent and the like, but it is general to adopt an aqueous solvent mainly containing water, which does not need to have high purity and hence which may be tap-water or groundwater. In addition to an acid solubilizing the magnesium alloy, the aqueous solvent preferably contains electrolytes such as salts so that the electrolysis treatment can proceed smoothly. Those salts may be originally contained in the aqueous solvent, may be beforehand added to the solvent, or may be added before or during the electrolysis treatment.

The magnesium alloy may have any alloy composition as long as containing magnesium. It may contain impurities. It is possible to control pH value of the aqueous solvent by utilizing the magnesium alloy. Accordingly, from the viewpoints of cost and environmental protection, it is particularly preferred to utilize scrap and waste materials containing magnesium alloys. However, depending on the alloy composition or ingredients of the scrap materials or the like, the reaction (2) may be inhibited from proceeding. In that case, conditions of the electrolysis treatment are preferably controlled so that the reaction (2) can preferentially proceed.

The magnesium alloy may be in any shape, and there are no particular restrictions on the way of immersing the alloy. The alloy may be sunk in the aqueous solvent, or may be so suspended as to be in contact with the solvent. Further, the magnesium alloy can be used as an electrode in the electrolysis treatment.

If necessary, an acid can be beforehand added into the aqueous solvent. The aqueous solvent can be thus made to have a low pH value so that magnesium can be partly solubilized to generate magnesium ions according to the formula (1). In that case, before the magnesium alloy is immersed therein, the aqueous solvent is preferably made to have a strongly acidic pH value. Specifically, the pH value is preferably 2 or less, more preferably 1 or less. In this stage, the magnesium alloy does not need to be completely dissolved. That is because it takes a long time to completely dissolve the magnesium alloy and also because the dissolution thereof proceeds in accordance with progression of the electrolysis treatment. In the embodiment, the "pH value" means the value under the conditions where the procedures are actually carried out. Accordingly, the temperature is not specified. If being out of the desired range, the pH value is preferably adjusted within the range preferred in the running procedure.

The acid adopted in this step is not limited to hydrochloric acid, and it is possible to use any other acid such as sulfuric acid, phosphoric acid, nitric acid or an organic acid. It is also possible to utilize waste hydrochloric acid or salts exhausted from plants and the like.

The acid is not necessarily added to the aqueous solvent. If having an appropriate pH value, the aqueous solvent can partly solubilize the magnesium alloy. Further, the electrolysis treatment conditions can be so controlled that the pH value of the aqueous solvent is adjusted for solubilizing the magnesium alloy. The acid may be added after the magnesium alloy is immersed in the aqueous solvent. When the magnesium alloy is immersed, the contained acid is consumed to dissolve magnesium and consequently the pH value increases to, for example, 4 to 5.

In this stage, hydrogen gas is generated as shown in the formula (1). The hydrogen gas may be recovered and reused as an energy resource.

Subsequently, carbon dioxide-containing gas is blown into the aqueous solvent. The gas contains carbon dioxide in a concentration of preferably 1 mass % or more, further preferably 10 mass % or more. As the carbon dioxide-containing gas thus introduced, preferred is gas unsuitable for direct emission into the environment, such as, exhaust gas released from plants or the like. As a result of the gas-blowing, the pH value changes. The pH value of the aqueous solvent after the gas-blowing is preferably 4 to 6. If the pH value is within this range, solubility of $CO_2$ increases and accordingly it becomes possible to fixate $CO_2$ in a more amount.

In the next step, the aqueous solvent in which magnesium ions and $CO_2$ are dissolved is subjected to the electrolysis treatment. Before this step, it is preferred to stop introducing the carbon dioxide-containing gas. Although the electrolysis treatment can be carried out while the carbon dioxide-containing gas is being introduced, the resultant precipitates tend to be produced with low efficiency.

For executing the electrolysis treatment, a pair of electrodes are placed in the aqueous solvent. There are no particular restrictions on the electrode material as long as the reaction of the formula (2) can proceed. For example, carbon electrodes are preferably adopted. It is also preferred to use the magnesium alloy immersed in the aqueous solvent as the electrode.

The electrodes are then connected to a power supply unit, and the electrolysis treatment is conducted to drive the reaction of the formula (2) and thereby to produce magnesium carbonate. Electric power used in this treatment is preferably renewable energy such as photovoltaic power or wind power. It is also preferred to utilize surplus electric energy given by electricity grids.

In the electrolysis treatment, the aqueous solvent preferably has a pH value in the range of 7 to 10. According as proceeding due to the electrolysis treatment, the reaction may change the pH value of the aqueous solvent containing the carbon dioxide-containing gas blown thereinto. In view of that, the conditions of the electrolysis treatment are preferably so controlled that the pH value may be within the above range. Accordingly, the electrolysis conditions are preferably adjusted with the pH value being monitored. As described above, before the electrolysis treatment, electrolytes such as salts may be added into the aqueous solvent so as to enhance the electroconductivity.

According as the electrolysis treatment proceeds, precipitates mainly containing magnesium carbonate are deposited. Since the aqueous solvent has a pH value of 7 to 10, the precipitates can be efficiently produced in the electrolysis treatment. The precipitates have low aqueous solubility, and hence hardly influence the reaction of the electrolysis treatment. However, they are accumulated in the bath where the electrolysis treatment is executed, and hence are preferably recovered from the bath according to necessity. The recovered precipitates have low toxicity, and hence can be subjected to simple waste disposal, such as, burial disposal.

Embodiment 1

From a waste personal computer, the housing thereof was taken out. From the housing, a piece of 5.7 g alloy material was cut off. The housing was made of a magnesium alloy containing magnesium in an amount of 90% or more. The piece of alloy material was then placed in 100 mL of 2N (2 mol/L) hydrochloric acid, and left until bubbles were hardly generated. In this step, the pH value of the aqueous solvent changed from pH=1 or less into pH=4.3. It was found that 1.57 g of the alloy material was dissolved.

Subsequently, $CO_2$ was blown into the aqueous solvent for 30 minutes and thereby dissolved therein. To the obtained solvent, NaCl as the electrolyte was added so that the concentration thereof might be 3.5%.

Successively, the resultant aqueous solvent was subjected to electrolysis treatment. As the anode and the cathode, the alloy material and a carbon electrode were adopted, respectively. During the treatment, the aqueous solvent was electrically energized with the pH value thereof being monitored. When the pH value exceeded pH=8, white precipitates were deposited. After collected by filtration and dried, the deposited white precipitates were weighed and found to be 0.42 g. The white precipitates showed an IR spectrum completely coincident with the spectrum given by white precipitates formed in water from mixture of sodium carbonate and magnesium chloride. From this result, the obtained white precipitates were assigned to basic magnesium carbonate $Mg(OH)_2 \cdot 3MgCO_3 \cdot 3H_2O$, which is a mixture of magnesium hydroxide and magnesium carbonate. Magnesium hydroxide contained in the mixture absorbs $CO_2$ in the atmospheric air and consequently converts into magnesium carbonate. Accordingly, the whole mixture ultimately turns into magnesium carbonate.

Thus, it was verified that magnesium carbonate can be easily produced to fixate carbon dioxide by utilization of waste magnesium alloys. This means that, if utilizing scrap materials containing magnesium alloys in combination with renewable energy, the above method enables $CO_2$ contained in carbon dioxide-containing gas emitted from plants to be fixated in an eco-friendly manner and without generating $CO_2$.

Embodiment 2-1

The following description will explain a system according to the embodiment. FIG. 1 schematically shows one of the embodiment, which utilizes relatively large scrap materials containing magnesium alloys.

A treating bath 101 contains an aqueous solvent 102, which is introduced through a pipe 102b from the outside. The introduced amount is controlled with a valve 102a.

Subsequently, a scrap material (magnesium alloy 103), which was once used for, for example, a car body, is hoisted and immersed with a crane (not shown) in the aqueous solvent 102 contained in the treating bath 101. The scrap material may be either completely sunk or suspended as shown in FIG. 1.

If necessary, before or after the scrap material is immersed, an acid can be introduced into the aqueous solvent 102 from an acid-introducing unit 104 through a valve 104a and a pipe 104b. The acid solubilizes a part of the scrap material to generate magnesium ions in the aqueous solvent. In this step, hydrogen gas is generated and hence can be recovered with a hydrogen-recovering unit (not shown).

Subsequently, $CO_2$ is blown into the aqueous solvent 102 from a unit 105 for introducing carbon dioxide-containing gas through a valve 105a and a pipe 105b, to dissolve $CO_2$ in the aqueous solvent 102.

After $CO_2$ is blown for a predetermined time or when the pH value monitored with a pH measuring unit 108 reaches a proper value, such as, pH=4, the $CO_2$ blowing is stopped.

Then, the obtained aqueous solvent is electrically energized and thereby subjected to electrolysis treatment by use of renewable energy supplied from a power unit 109 through a wiring line 109a. Prior to the electrolysis treatment, proper electrolytes can be beforehand added into the aqueous solvent so as to adjust the electroconductivity. Examples of the electrolytes include NaCl. As the anode in the electrolysis treatment, the scrap material can be used. In that case, electric power is supplied to the magnesium alloy 103 and an electrode 107 from a power control unit 106 through wiring lines 107a. On the basis of known expertise, the conditions of the electrolysis treatment can be so controlled as not to generate chlorine but to elute magnesium ions from the magnesium alloy 103 used as the electrode. During the electrolysis treatment, it is possible to monitor the pH value with a pH monitoring unit 108 and to control the conditions sequentially according to the monitored pH value. According as the electrolysis treatment proceeds, the aqueous solution gradually becomes so basic as to deposit precipitates of magnesium carbonate or basic magnesium carbonate.

If necessary, the system can be further equipped with a precipitate-recovering unit 110 with which the formed precipitates are recovered.

Embodiment 2-2

Figure 2:
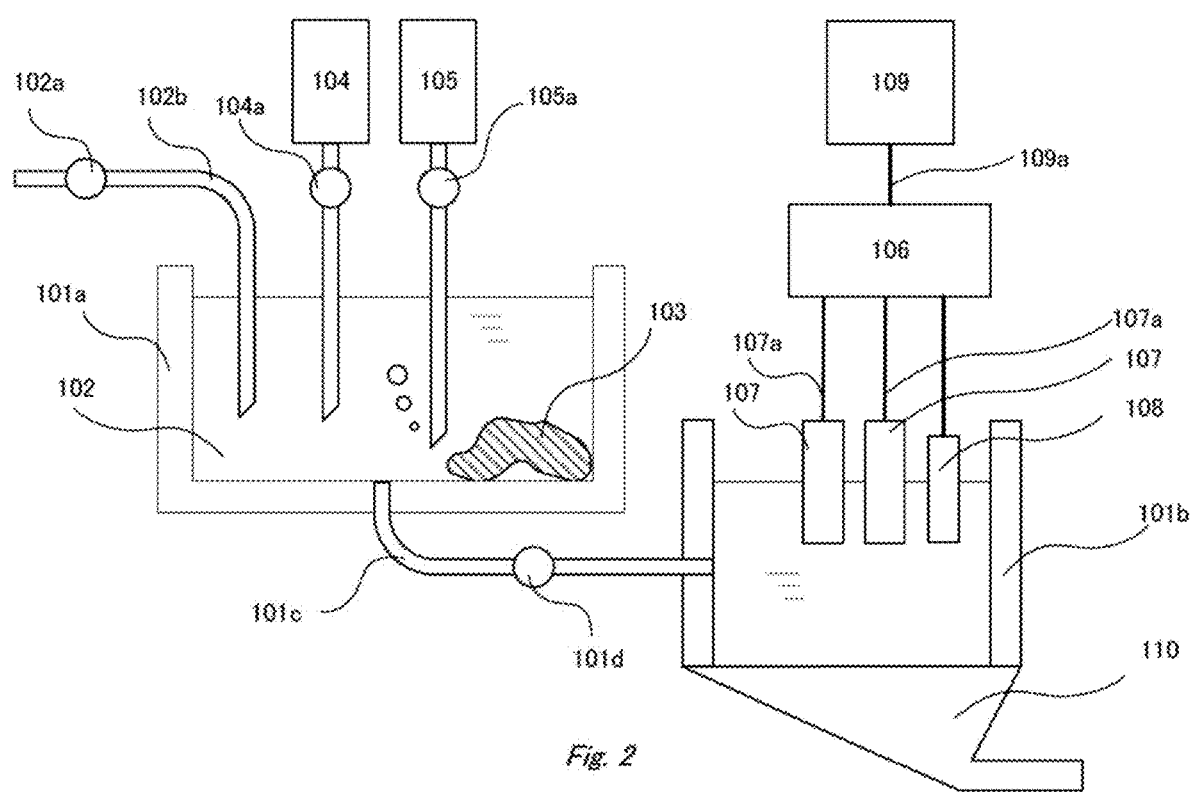
FIG. 2 schematically shows another carbon dioxide fixation system according to the embodiment.

The following description will explain another system according to the embodiment. FIG. 2 schematically shows another of the embodiment.

A treating bath 101a contains an aqueous solvent 102, which is introduced through a pipe 102b from the outside. The introduced amount is controlled with a valve 102a.

Subsequently, a scrap material (magnesium alloy 103), which was once used for, for example, a car body, is immersed in the aqueous solvent 102 contained in the treating bath 101. The scrap material may be either completely sunk as shown in FIG. 2 or partly suspended.

Before or after the scrap material is immersed, an acid is introduced into the aqueous solvent 102 from an acid-introducing unit 104 through a valve 104a and a pipe 104b. The acid solubilizes a part of the scrap material to generate magnesium ions in the aqueous solvent. In this step, hydrogen gas is generated and hence can be recovered with a hydrogen-recovering unit (not shown).

Subsequently, $CO_2$ is blown into the aqueous solvent 102 from a unit 105 for introducing carbon dioxide-containing gas through a valve 105a and a pipe 105b, to dissolve $CO_2$ in the aqueous solvent 102.

After $CO_2$ is blown for a predetermined time, the $CO_2$ blowing is stopped. It is also possible to install an auxiliary pH measuring unit in the treating bath 101a. In that case, when the pH value monitored with the auxiliary pH measuring unit reaches a proper value, such as, pH=4, the $CO_2$ blowing is stopped.

After the $CO_2$ blowing is completed, a valve 101d is opened to transfer the aqueous solvent into another treating bath 101b through a pipe 101c.

Then, the transferred aqueous solvent in the treating bath 101b is electrically energized and thereby subjected to electrolysis treatment by use of renewable energy supplied from a power unit 109 through a wiring line 109a. Prior to the electrolysis treatment, proper electrolytes can be beforehand added into the aqueous solvent so as to adjust the electroconductivity. In that case, the electrolytes can be introduced into the aqueous solvent through an electrolyte-introducing unit (not shown). Examples of the electrolytes include NaCl. As an electrode 107, a carbon electrode is preferably adopted. On the basis of known expertise, the conditions of the electrolysis treatment can be so controlled as not to generate chlorine but to elute magnesium ions from the magnesium alloy 103 used as the electrode. During the electrolysis treatment, it is possible to monitor the pH value with a pH monitoring unit 108 and to control the conditions sequentially according to the monitored pH value. According as the electrolysis treatment proceeds, the aqueous solution 102 gradually becomes so basic as to deposit precipitates of magnesium carbonate or basic magnesium carbonate.

If necessary, the system can be further equipped with a precipitate-recovering unit 110 with which the formed precipitates are recovered.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fail within the scope and sprit of the invention.

The invention claimed is:

1. A carbon dioxide fixation method comprising:
immersing a single pair of an anode consisting of a magnesium alloy and a cathode in a single aqueous solvent which is stored in a single treating bath;
performing an acid-addition in which an acid is added to said aqueous solvent to obtain a pH value of 2 or less;
performing a gas-blowing in which carbon dioxide-containing gas is blown into said aqueous solvent having a pH of 2 or less to obtain a pH value of 4 to 6; and
performing an electrolysis treatment in which said aqueous solvent is electrically energized using said single pair of said anode and said cathode and thereby subjected to electrolysis treatment so as to elute magnesium ions from said magnesium alloy and to produce precipitates containing magnesium carbonate,
wherein conditions of said electrolysis treatment are controlled so that a pH value of said aqueous solvent is maintained between 7 and 10 while said electrolysis treatment is conducted, and the blowing of said carbon dioxide-containing gas is stopped before said electrolysis treatment.

2. The method according to claim 1, further comprising adding electrolytes into said aqueous solvent prior to said electrolysis treatment.

3. The method according to claim 1, wherein a carbon electrode is used as said cathode in said electrolysis treatment.

4. The method according to claim 1, wherein the electric power used in said electrolysis treatment is renewable energy produced by photovoltaic power or wind power.

5. The method according to claim 1, wherein said electrolysis treatment further generates hydrogen, and
still further comprising a hydrogen recovery in which the hydrogen is recovered.

6. The method according to claim 1, further comprising a precipitate recovery in which said precipitates are recovered.

7. The method according to claim 1, wherein said magnesium alloy is scrap or waste material.

8. The method according to claim 1, wherein said carbon dioxide-containing gas is exhaust gas released from a power plant.

9. A method for producing precipitates containing magnesium carbonate, comprising:
immersing a single pair of an anode consisting of a magnesium alloy and a cathode in a single aqueous solvent which is stored in a single treating bath;
adding an acid to said aqueous solvent to obtain a pH value of 2 or less;
blowing carbon dioxide-containing gas into the aqueous solvent to obtain a pH value of from 4 to 6; and
electrically energizing and thereby subjecting the aqueous solvent to electrolysis treatment using said single pair of an anode and a cathode so as to elute magnesium ions from said magnesium alloy and to produce precipitates containing magnesium carbonate,
wherein conditions of said electrolysis treatment are controlled so that a pH value of said aqueous solvent is maintained between 7 and 10 while said treatment is conducted, and the blowing of said carbon dioxide-containing gas is stopped before said electrolysis treatment.

10. A carbon dioxide fixation method comprising:
preparing an aqueous solvent having a pH value of 2 or less which is stored in a single treating bath;
immersing a single pair of an anode consisting of a magnesium alloy and a cathode in said aqueous solvent;
performing a gas-blowing in which carbon dioxide-containing gas is blown into said aqueous solvent to obtain a pH value of from 4 to 6; and
performing an electrolysis treatment in which said aqueous solvent is electrically energized and thereby subjected to electrolysis treatment using said single pair of an anode and a cathode so as to elute magnesium ions from said magnesium alloy and to produce precipitates containing magnesium carbonate,
wherein conditions of said electrolysis treatment are controlled so that a pH value of said aqueous solvent is maintained between 7 and 10 while said treatment is conducted, and the blowing of said carbon dioxide-containing gas is stopped before said electrolysis treatment.

11. A method for producing precipitates containing magnesium carbonate, comprising:
preparing an aqueous solvent having a pH value of 2 or less which is stored in a single treating bath;
immersing a single pair of an anode consisting of a magnesium alloy and a cathode in said aqueous solvent;
blowing carbon dioxide-containing gas into the aqueous solvent to obtain a pH of from 4 to 6; and
electrically energizing and thereby subjecting the aqueous solvent to electrolysis treatment using said single pair of an anode and a cathode so as to elute magnesium ions from said magnesium alloy and to produce precipitates containing magnesium carbonate,
wherein conditions of said electrolysis treatment are controlled so that a pH value of said aqueous solvent is maintained between 7 and 10 while said treatment is conducted and the blowing of said carbon dioxide-containing gas is stopped before said electrolysis treatment.

* * * * *